Sheet 1-2 Sheets.

B. Mee,

Horseshoe Machine,

No. 1,829. Reissued Nov. 29, 1861.

Witnesses:
Robt. Bannitridge
Chester Griswold

Inventor:
Barney Mee

N. PETERS, PHOTO-LITHOGRAPHER, WASHINGTON, D. C.

Sheet 2 - 2 Sheets.
B. Mee,
Horseshoe Machine,
No. 1829.
Reissued Nov. 29, 1864.
Fig. 5.
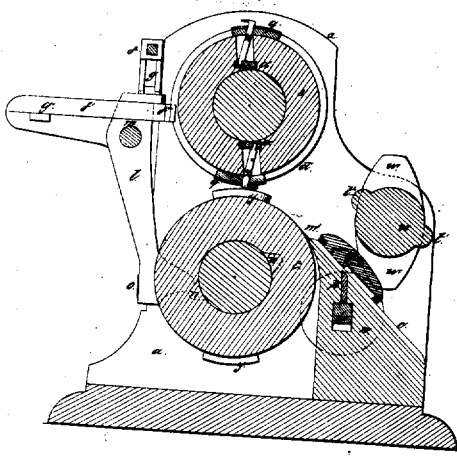
Fig. 6.
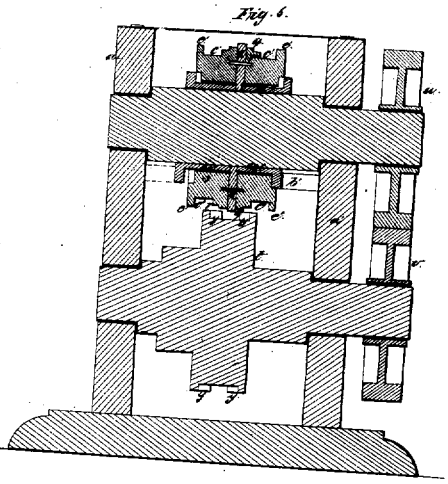
Fig. 7.
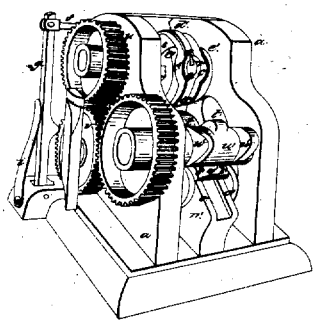
Fig. 8.
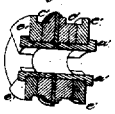
Fig. 9.
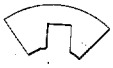
Fig. 10.
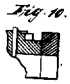
Fig. 11.
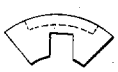
Fig. 12.
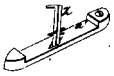
Fig. 13.
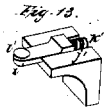
Fig. 14
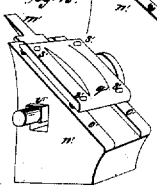
Fig. 15.
Fig. 16.
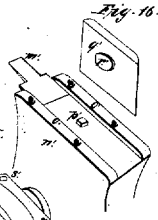
Witnesses
Robt. Bumbridge
Chas. Schwold
Inventor:
Barney Mee
N. PETERS, PHOTO-LITHOGRAPHER, WASHINGTON, D. C.

UNITED STATES PATENT OFFICE.

BARNEY MEE, OF TROY, NEW YORK.

IMPROVEMENT IN MACHINES FOR MAKING HORSESHOES.

Specification forming part of Letters Patent No. 38,873, dated June 9, 1863; Reissue No. 1,829, dated November 29, 1864.

*To all whom it may concern:*

Be it known that I, BARNEY MEE, of Troy, Rensselaer county, and State of New York, have invented certain new and useful Improvements in Machinery for Making Horse and Mule Shoes; and I do hereby declare that the following is a full, clear, and exact description thereof, reference being had to the accompanying drawings, making part of this specification, in which—

Figure 1:
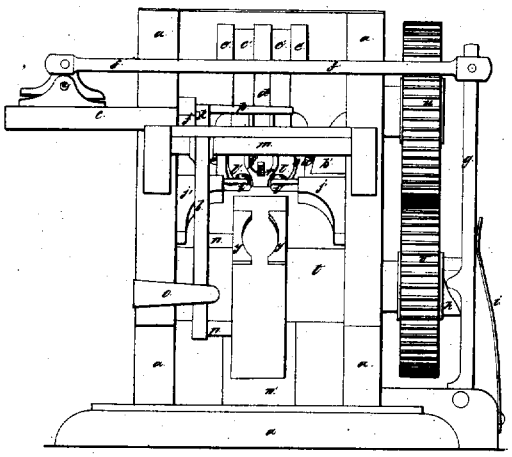
Figure 3:
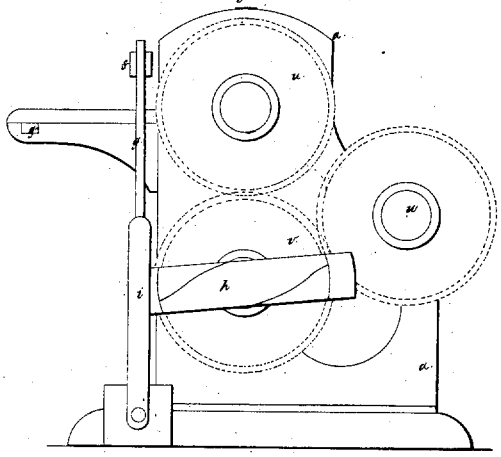
Figure 2:
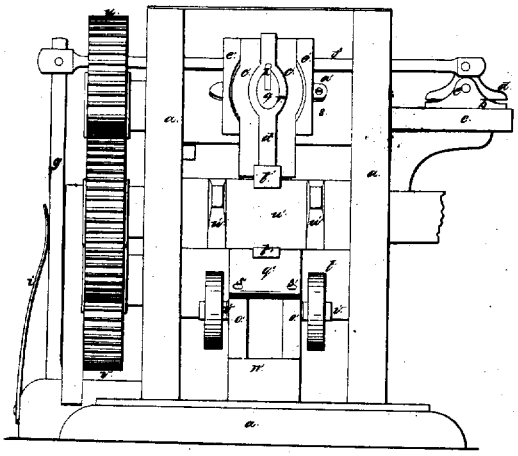
Figure 4:
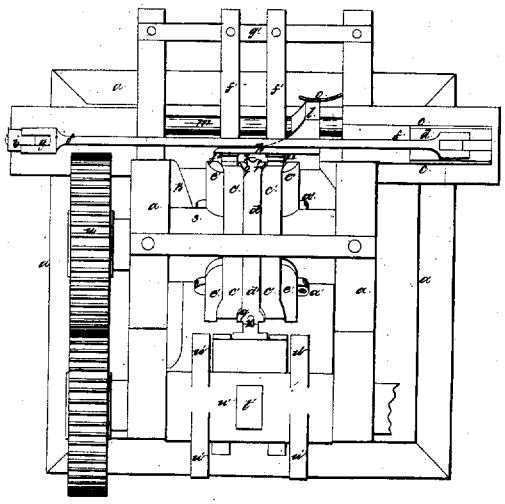

Figure 1 is a front elevation; Fig. 2, a rear elevation; Fig. 3, a side elevation; Fig. 4, a top view; Fig. 5, a vertical section taken at right angles to the axes of the rollers which carry the forming-dies; Fig. 6, a vertical section taken in the plane of the axes of the rollers which carry the forming-dies; Fig. 7, a perspective view, and Figs. 8, 9, 10, 11, 12, 13, 14, 15, and 16, represent separate parts, as hereinafter described.

My said invention relates to improvements in machinery for forming horse and mule shoes described in and secured by Letters Patent of the United States granted to Barzilla Young and Samuel Titus on the 29th day of July, 1837, in which the rod of iron, in the heated state, is introduced in front of two rollers which carry the dies for rolling and creasing, and the mold around which the rod of iron is bent to the form required before it is passed between the dies.

For forming horseshoes by machinery three modes of operation were adopted prior to my said invention. By the first of these modes a square rod of iron, cut to the required length, was bent around a mold of the form of the inside of the intended shoe. This mold projected from the flat surface of a reciprocating carriage, and at the sides of the mold there were rollers, one on each side, having a lateral motion to follow the curvature of the sides of the mold as it reciprocated, so that by placing the rod of iron red-hot between the two rollers and the curved end of the mold, as the latter advanced the rod was bent around it by the two bending-rollers. The rod of iron thus bent was removed from the mold and flattened and swaged between two dies of a form the reverse of the intended shoe, and thereby beveled and grooved. By another mode of operation a square rod of iron in the red-hot state was passed between rotating segment-dies, and thereby flattened, beveled, and grooved, and afterward bent around a mold to give it the required curvature; and by the third of these modes of operation described in the before-recited Letters Patent granted to Barzilla Young and Samuel Titus, and bearing date the 29th day of July, 1837, the operation of bending the rod and swaging to flatten, bevel, and groove the iron were rendered continuous by a rotary motion. The swaging-dies to bevel and groove the iron were placed on the peripheries of two rollers, and the mold to bend the rod of iron projected from the face of one of these swaging-dies. As the rollers carrying the swaging-dies and mold rotated, the rod of iron of the required length was introduced in front of two bending-levers, armed with friction-rollers, and moving laterally in opposite directions from and toward the mold to follow the curvatures thereof to bend the rod of iron around it, as it (the mold) passed between them in its revolution.

The latter of the three modes of operation thus indicated is the most rapid; but as the rod of iron is thereby bent around the mold, which projects from the face of one of the rotating swaging-dies, and while so in contact with the mold it is carried between the dies to be beveled and grooved, the operation of rolling the iron to make it thinner toward the inner edge of the toe of the shoe is restrained by contact with the mold, and the iron has to be forced backward against instead of spreading out in the direction of the rolling action.

To obviate this defect, Harry A. Wills invented an improvement, described in Letters Patent of the United States granted to him, and bearing date the 2d day of March, 1858, which improvement consists in combining with the rotating mold and dies a pushing-instrument, which, so soon as the rod of iron is bent around the mold, forces the forward or toe part of the intended shoe sufficiently from the front part of the mold to leave the required space for the spread of the iron by the swaging operation of the beveling and grooving or creasing dies. The mechanism for relieving the bent rod of iron from the front curved edge of the mold, as described in the said Wills' patent, does not rotate with the mold, and the mechanism was for that reason complicated, and on the 3d day of July, 1860, the said Wills obtained another patent for an improvement, by which the instrument for pushing the bent shoe-blank from the front curved edge of the mold is attached to and rotates with the mold; and the object of the first part of my said invention was to simplify and render the improvements invented by the said Wills more simple, practical, and efficient.

To this end the first part of my said invention consists in operating the lever, which carries the instrument which pushes and relieves the bent rod from the front edge of the mold, and which lever is located in a recess in the mold, and in the roller which carries the mold, by a sliding bar having an oblique mortise, the ends of the said sliding bar extending through the ends of the roller to be acted upon by suitable mechanism outside.

In the accompanying drawings, *a* represents a frame suitable for the purpose. The rod of iron from which the shoes are to be formed is fed into the machine, as it comes from a furnace, by a pair of self-acting reciprocating nippers composed of a lower jaw, *b*, adapted to slide horizontally in suitable ways, *c*, and an upper gripping-jaw, *d*, which is hinged to two ears projecting from the lower jaw by a fulcrum-pin, *e*. These nippers are operated by a rod, *f*, connected by a hinge-pin to the upper jaw, *d*, above its fulcrum-pin, and to the upper end of a lever, *g*, which is vibrated in one direction to give the required feed motion by a face-cam, *h*, on the shaft of one of the die-rollers, (to be presently described,) and in the opposite direction for the return of the nippers by the the tension of a spring, *i*.

The rod of iron is inserted by hand between the two jaws while open, and as the required feed motion is communicated by the rod *f*, connected with the upper jaw above the fulcrum-pin by which it is connected with the lower jaw, it follows that the first effect of a pull on the said connecting-rod will be to cause the rod to be gripped by the upper onto the lower jaw, the grip being such as to move the two jaws with the rod between them. The upper jaw is so formed or provided with a stop that on the return motion the upper jaw will not grip the rod.

By the feed motion above described the rod of iron is introduced in front of the die rollers to the required distance, or until the end of it strikes against a suitable gage, and the required length for a shoe is cut off by a pair of shears, one blade, *j*, being stationary and the other *k*, (see Fig. 1,) secured to the upper end of an arm, *l*, of a rock-shaft, *m*, the said arm *l* extends down in front of a cam, *n*, on the shaft of the lower die-roller, the said cam giving the required shearing motion, a spring, *o*, being employed to give the return motion.

On the side of the upper part of the arm which carries the movable cutter *k*, there is a straight edge, *p*, which comes in contact with that part of the rod which has been cut off, and by a continuation of the motion it is pushed inward toward and against the periphery of the upper die-roller to be bent to the form required for a horseshoe.

The mold *q*, for determining the form of the inside of the shoe, projects from the face of the die *r* on the cylindrical surface of the roller *s*.

There are two rollers, *s* and *t*, on parallel shafts mounted in suitable boxes in the frame, in the usual manner of rollers for rolling iron, and geared to turn in opposite directions, with equal velocity, by two spur-wheels, *u v*. These rollers carry one, two, or more pairs of dies, *r r*, the accompanying drawing, representing two pairs, to form two shoes at one revolution. As both pairs are alike in all respects, the description of one pair will suffice. The faces of the two dies constituting one pair are of such form that if formed on two flat instead of cylindrical surfaces, and placed at a distance apart equal to the distance at which they pass each other in their revolution, the space between them would just be of the form of the horseshoe to be produced. As it is the practice to make one face of the shoe flat, one of the dies is simply part of the cylindrical face of the roller. From the surface of one of these dies projects the inner or male mold, *q*, of the form of the inside of the intended shoe, and at the sides of the other of the said dies, and projecting above its face, are two side formers or checks, *y y*, which together constitute the female mold; these, however, only extend from the heels to what is termed the "toe" of the shoe, so that there is a considerable space left between them at both ends.

A mortise is formed through the male mold *q* and in toward the shaft of the roller which carries it and extending for a short distance forward toward the front or toe end of the mold. In this mortise or recess is mounted a short lever, *z*, hung on a fulcrum-pin in the roller, the mortise being of sufficient capacity to permit the lever to have a slight vibratory motion in the direstion of the rotation of the roller and back, which vibration is imparted by a bar, *a'*, parallel with the axis of the roller, and which is fitted to slide in the direction of its length in a recess or mortise in the roller, the ends of the bar extending beyond the ends of the roller, so as to be acted upon at one end by a spring to push it in one direction, and at the other end by a fixed cam, *b'*, attached to the frame to push it in the opposite direction. This sliding bar has a diagonal mortise, to receive the inner end of the lever *z z*, so that the sliding of the bar will give the required vibrations to the lever. The outer end of this lever *z* projects a little beyond the outer face of the mold, and is formed with a projecting spur in front, which extends nearly to the front or toe edge of the mold when that end of the lever is thrown back, but projects beyond it when thrown forward. The periphery of the roller which carries the male mold is formed with two cam-grooves, $c'$ $c'$, extending all around its circumference, which grooves are formed on the inside by the side edges of the die $r$ and a fillet, $d'$, with parallel sides, and on the outside by flange-pieces, $e'$ $e'$, the two sides of each groove being parallel. To these two cam-grooves are fitted two cylindrical rollers, $f''$ $f''$, mounted on the inner end of two bending-levers $f'$ $f'$, and fitted so freely to the grooves that when they touch one side they shall clear the other to prevent abrasion. Another pair of rollers, $f^2$ $f^2$, termed the "bending-rollers," are mounted in like manner on the same bending-levers, and just back of the rollers that run in the said grooves. The opposite or outer end of the bending-levers turn on fulcrum-pins on a front bar, $g'$, of the frame.

When, as before described, the rod to be formed into a shoe has been cut off and is pushed against the periphery of the upper roller, it lies just over the bending-rollers of the bending levers $f'$ $f'$, and as the roller which carries the male mold rotates in the direction of the arrow the front or toe edge of the male mold comes in contact with the middle thereof, and midway between the two bending-rollers, which, simultaneously receiving motion laterally from and then toward the male mold, effectually bend the ends of the rod around the toe or front end, and then around the sides to the rear or heel end of the mold.

So soon as the mold is embraced by the rod of iron bent around it, as last described, one end of the sliding bar $a'$ reaches the fixed cam $b'$, by which it is forced to slide, and by its diagonal groove vibrates the lever $z$ forward. This brings the spur or pusher on the outer end of this lever against the inner curved edge of the bent rod—that is to say, against the part which is to form the inner edge of the toe of the shoe, which is thus pushed forward on the die a short distance and relieved from the front or toe edge of the male mold. The sides or heel portions of the rod, which embrace the narrower portion of the mold, will readily yield to allow of this forward movement, while at the same time they will continue their grip on the mold. By thus relieving the toe portion of the shoe from the mold the after operation of rolling between the dies to bevel and spread the metal inward is facilitated and all tendency to form a fin on the inner edge of the shoe is prevented.

So soon as the bent iron is thus pushed forward from the front end of the mold the sliding bar $a'$ passes by the cam $b'$, and it is then pushed in the opposite direction by the spring, and this draws back the pushing-lever $z$ to its original position in the mold, and the continued rotation of the rollers carries the bent rod in the bite of the two rollers and between the dies, by which it is rolled to the required form, creased, and the marks for the nail-holes made; and in being thus rolled it is forced into the cavity of the female die on the lower roller.

As the swaging is being performed by the rolling operation of the dies, the tendency is to open or spread apart the shoe at the heels; but this is prevented by the rounded edges of two bars, $i'$ $i'$, which are adapted to slide in suitable ways in two brackets, $j'$ $j'$. They are forced against the sides of the shoe on the mold by springs $k'$ $k'$, (see Fig. 13,) one for each bar, and they are guided by rollers $l'$ $l'$, that run in the grooves of the upper roller just like the rollers on the bending-levers. In this way all tendency to spread the heels of the shoe by the creasing operation is effectually prevented.

It will be understood that there must be one complete set of parts and movements, such as described, for each pair of dies on the die-rollers.

The dies, the molds, and the side pieces, forming the cam-groove for operating the bending-levers are made separate from and attached to the die-rollers by suitable bolts that they may be readily removed and replaced by others, so that on any one machine horse and mule shoes of all sizes can be made.

After a shoe has been formed as above described, it lies in the cavity of the female mold out of which it is to be drawn. This may be done in various ways, but that which I have adopted is represented in the accompanying drawings.

Back of the lower roller there is a flat piece of iron, $m'$, with the forward end brought to an edge somewhat like a chisel. This "scraper," as it may be termed, is attached to a block, $n'$, on the frame in such a position that its thin edge will be in contact with the periphery of the lower roller and in line with the space on the roller between the two side formers, $y$ $y$, constituting the female mold. From the foregoing it will be seen that when the formed shoe, by the continued rotation, reaches the sharp edge of the instrument $m'$, the surface of which is tangent to the periphery of the roller, it will pass on to the upper surface of the said instrument, and the mold, traveling in its curved path, will draw itself way from the shoe, which, being thus liberated, will fall.

The upper surface of the block $n'$ forms an inclined plane in continuation of the upper surface of the scraper $m'$, that liberates the formed shoe, and it has two parallel side flanches, $o'$ $o'$, to form an inclined trough a little wider than a shoe, so that the shoe, when liberated, will descend in this inclined trough until it reaches a stop, $p$, (see Fig. 15,) by which it is arrested, and while there it is flattened by a reciprocating platen, $q'$, which has a die, $r'$, on its face corresponding to the form of the beveled face of the shoe when flattened. This platen slides on guide-rods $s'$. It is forced upward to relieve the shoe by springs, and forced down to flatten it by a cam, $t'$, on a shaft, $u'$, which receives motion from the spur-wheel on the shaft of the lower roller.

The stop $p'$ is movable up and down to stop a shoe to be flattened and to liberate it after it has been flattened. To this end it is fitted to slide up and down in a hole through the bottom of the inclined trough, and its lower end is attached to a horizontal bar, $v'$, adapted to slide in vertical ways. It is borne up by springs and depressed by two cams, $w'$ $w'$, on the shaft $u'$. When the shoe is liberated by the stop $p'$, it falls into a suitable receptacle, as it does when liberated from the lower roller, by the force of gravity.

What I claim as my invention, and desire to secure by Letters Patent, is—

Combining with the rotating male mold around which the rod of iron is bent the vibrating lever for pushing the rod when bent away from the front or toe end of the mold, and the sliding bar, with its diagonal groove for operating the said vibrating-lever, substantially as herein described.

BARNEY MEE.

Witnesses:
C. E. PATTERSON,
C. R. INGALLS.